United States Patent
Takizawa (10) Patent No.: US 10,946,725 B2
(45) Date of Patent: Mar. 16, 2021

(54) REFRIGERATION SYSTEM AND CONTROL DEVICE

(71) Applicant: DENSO CORPORATION, Kariya (JP)

(72) Inventor: Ryo Takizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 16/351,934

(22) Filed: Mar. 13, 2019

(65) Prior Publication Data

US 2019/0210431 A1 Jul. 11, 2019

Related U.S. Application Data

(63) Continuation of application No. PCT/JP2017/026348, filed on Jul. 20, 2017.

(30) Foreign Application Priority Data

Sep. 19, 2016 (JP) .............................. JP2016-182461

(51) Int. Cl.
*B60H 1/32* (2006.01)
*F25B 27/00* (2006.01)
(Continued)

(52) U.S. Cl.
CPC ......... *B60H 1/3211* (2013.01); *B60H 1/3226* (2013.01); *F02D 29/06* (2013.01);
(Continued)

(58) Field of Classification Search
CPC ............... B60H 1/3211; B60H 1/3226; B60H 2001/3261; B60H 2001/3272;
(Continued)

(56) References Cited

U.S. PATENT DOCUMENTS 8,295,950 B1 * 10/2012 Wordsworth .......... B60H 1/323
700/22
9,057,317 B2 * 6/2015 Vuk .......................... F01P 7/04
(Continued)

FOREIGN PATENT DOCUMENTS

JP 2001275400 A 10/2001
JP 2002372357 A 12/2002
(Continued)

*Primary Examiner* — Marc E Norman
(74) *Attorney, Agent, or Firm* — Harness, Dickey & Pierce, P.L.C.

(57) ABSTRACT

A refrigeration system includes a generator, a power generation engine, a refrigerator, an electric power converter, an output control unit, and a characteristic estimation unit that estimates a refrigerator characteristic of a refrigerator according to an outside air temperature and a temperature of a cooling target space. The refrigeration system includes an output calculation unit that calculates a drive output as a target drive output that optimizes an energy efficiency of the entire system based on the refrigerator characteristic estimated by the characteristic estimation unit, an engine characteristic of the power generation engine, and a generator characteristic of the generator. Further, the output control unit controls the drive output to approach the target drive output calculated by the output calculation unit.

7 Claims, 7 Drawing Sheets

(51) Int. Cl.
 *F25D 11/00* (2006.01)
 *F02D 29/06* (2006.01)
 *F02D 41/02* (2006.01)

(52) U.S. Cl.
 CPC .............. *F25B 27/00* (2013.01); *F25D 11/00* (2013.01); *B60H 2001/3261* (2013.01); *B60H 2001/3272* (2013.01); *F02D 41/021* (2013.01); *Y02P 60/85* (2015.11)

(58) Field of Classification Search
 CPC ........ F02D 29/06; F02D 41/021; F25B 27/00; F25D 11/00; Y02P 60/85
 See application file for complete search history.

(56) References Cited

U.S. PATENT DOCUMENTS

| | | | |
|---|---|---|---|
| 2001/0030843 A1 | 10/2001 | Takagi | |
| 2012/0167605 A1 | 7/2012 | Ikemiya et al. | |
| 2013/0166181 A1* | 6/2013 | Pan | F02D 41/1406 701/110 |
| 2020/0231041 A1* | 7/2020 | Lavrich | F25B 27/00 |

FOREIGN PATENT DOCUMENTS

| | | |
|---|---|---|
| JP | 2011011643 A | 1/2011 |
| JP | 2011149685 A | 8/2011 |
| JP | 2012197988 A | 10/2012 |

\* cited by examiner

REFRIGERATION SYSTEM AND CONTROL DEVICE

CROSS REFERENCE TO RELATED APPLICATIONS

The present application is a continuation application of International Patent Application No. PCT/JP2017/026348 filed on Jul. 20, 2017, which designated the United States and claims the benefit of priority from Japanese Patent Application No. 2016-182461 filed on Sep. 19, 2016. The entire disclosures of all of the above applications are incorporated herein by reference.

TECHNICAL FIELD

The present disclosure relates to a refrigeration system applied to a moving object and a control device for the refrigeration system.

BACKGROUND

A refrigeration system for vehicles, such as those for refrigerated tractor trailers, may be driven by an electric power from a generator driven by a power generation engine. In case the refrigeration system experiences variable load, it may be desirable to improve the energy efficiency of the entire system while reducing complexity.

SUMMARY

According to one aspect of the present disclosure, a refrigeration system may include a generator, a power generation engine that drives the generator, a refrigerator that adjusts a temperature of a cooling target space, an electric power converter that converts an electric power generated by the generator into a drive output for the refrigerator and supplies the drive output to the refrigerator, an output control unit that controls the drive output from the electric power converter to the refrigerator to adjust an operation state of the refrigerator, a characteristic estimation unit that estimates a refrigerator characteristic of the refrigerator according to an outside air temperature and a temperature of the cooling target space, and an output calculation unit that calculates the drive output as a target drive output that optimizes an energy efficiency of the entire system based on the refrigerator characteristic estimated by the characteristic estimation unit, a preset engine characteristic of the power generation engine, and a preset generator characteristic of the generator. Further, the output control unit controls the drive output to approach the target drive output calculated by the output calculation unit.

DETAILED DESCRIPTION

Hereinafter, embodiments of the present disclosure will be described with reference to the drawings. In the following embodiments, portions that are the same as or equivalent to those described in the preceding embodiments are denoted by the same reference numerals, and a description of those portions may be omitted. In addition, when only a part of components is described in the embodiment, the components described in the preceding embodiment can be applied to other parts of the components. In the following embodiments, the embodiments can be partially combined with each other as long as there is particularly no trouble in combination, even if the combinations are not specified in particular.

First Embodiment

The present embodiment will be described with reference to FIGS. 1 to 9. In the present embodiment, an example in which a refrigeration system 20 according to the present disclosure is applied to a refrigeration vehicle 1 that transports frozen foods and the like will be described. In the present embodiment, the refrigeration vehicle configures a moving object to which the refrigeration system 20 is applied.

Figure 1:
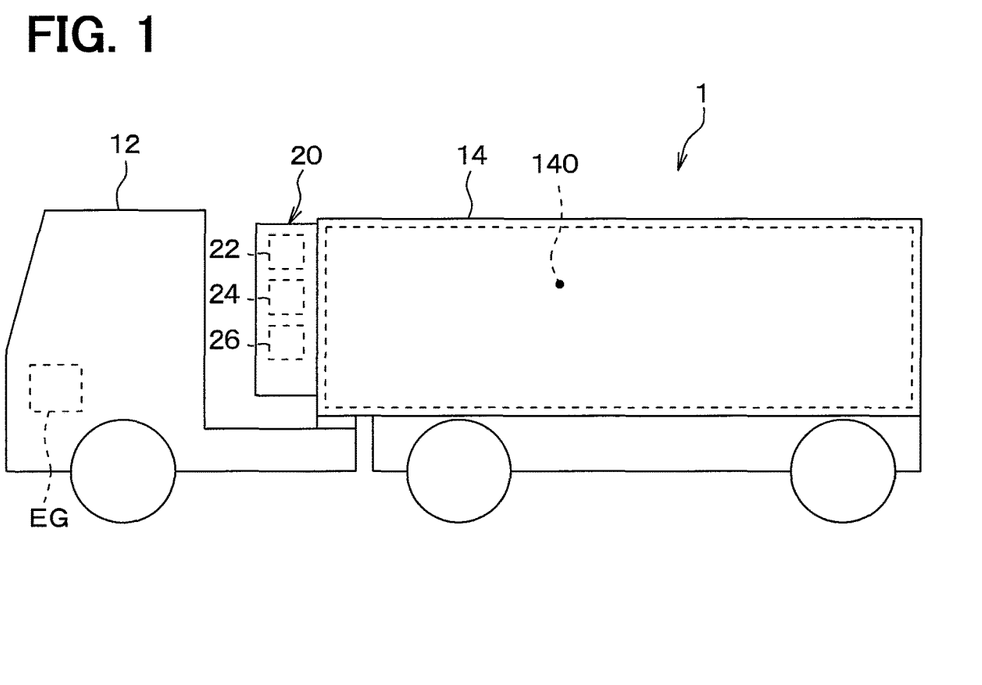
FIG. 1 is a schematic configuration diagram of a refrigeration vehicle equipped with a refrigeration system according to a first embodiment.

As shown in FIG. 1, the refrigeration vehicle 1 includes a tractor 12 and a trailer 14 in which a cargo such as frozen foods is stored. The tractor 12 is a towing vehicle that tows the trailer 14. The tractor 12 incorporates an engine EG for vehicle travel.

The trailer 14 is formed with a storage space 140 in which a cargo such as frozen foods is stored. The trailer 14 is provided with an apparatus in which components of the refrigeration system 20 are unitized at a position facing the tractor 12.

The refrigeration system 20 includes a refrigerator 22 that adjusts a temperature of the storage space 140, a power generation engine 24, and a generator 26 that is driven by the power generation engine 24 and outputs an electric power to be supplied to the refrigerator 22.

Figure 2:
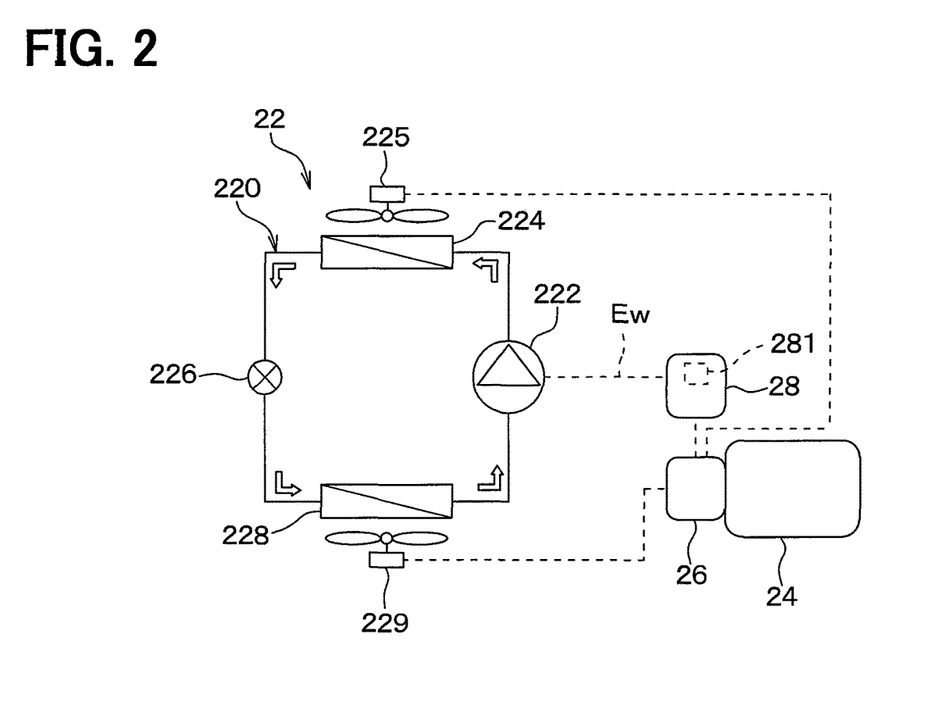
FIG. 2 is a schematic configuration diagram of a refrigeration system according to the first embodiment.

As shown in FIG. 2, the refrigerator 22 according to the present embodiment is provided by a vapor compression type refrigeration cycle 220. The refrigeration cycle 220 adjusts a temperature of an air for cooling the storage space 140. According to the present embodiment, the storage space 140 configures a cooling target space. In the refrigeration cycle 220, a compressor 222, a radiator 224, an expansion valve 226, and an evaporator 228 are connected to each other through a refrigerant pipe.

Among the components of the refrigeration cycle 220, the compressor 222 compresses and discharges a refrigerant. The compressor 222 is an electric compressor that rotationally drives a fixed capacity type compression mechanism having a fixed discharge capacity by an electric motor. A rotation speed of the electric motor of the compressor 222 is controlled in accordance with a control signal output from the control device 100, which will be described later.

A refrigerant discharge side of the compressor 222 is connected to a refrigerant inlet side of the radiator 224. The radiator 224 is a heat exchanger that exchanges a heat between an outside air blown from a first blower 225 and the refrigerant discharged from the compressor 222 to radiate the heat of the refrigerant. The first blower 225 is driven by the electric power supplied from the generator 26.

A refrigerant outlet side of the radiator 224 is connected with a refrigerant inlet side of an expansion valve 226. The expansion valve 226 is a pressure reducing device for decompressing and expanding the refrigerant that has flowed out of the radiator 224. The expansion valve 226 includes an electric expansion valve having a valve body configured to be able to change a throttle opening degree and an electric actuator for changing the throttle opening degree of the valve body. The throttle opening degree of the expansion valve 226 is controlled in accordance with a control signal output from the control device 100, which will be described later.

A refrigerant inlet side of the evaporator 228 is connected to a refrigerant outlet side of the expansion valve 226. The evaporator 228 is a heat exchanger that exchanges a heat between the air circulated and blown in the storage space 140 by a second blower 229 to evaporate the refrigerant. The air blown from the second blower 229 to the evaporator 228 is cooled by a heat absorbing action due to a latent heat of evaporation of the refrigerant in the evaporator 228. The second blower 229 is driven by an electric power supplied from the generator 26.

The power generation engine 24 is an engine provided separately from the engine EG for vehicle travel. The power generation engine 24 is a constant speed engine whose rotation speed is maintained at a predetermined reference rotation speed. The power generation engine 24 according to the present embodiment is a constant speed engine whose rotation speed is maintained at a constant rotation speed (for example, 1800 rpm).

The generator 26 is directly connected to an output shaft of the power generation engine 24. The generator 26 generates a power by the power of the power generation engine 24. The generator 26 is connected to the compressor 222 of the refrigerator 22 through an electric power converter 28 through an electric wiring Ew. The first blower 225 and the second blower 229 of the refrigerator 22 are configured to be supplied with the electric power from the generator 26 without passing through the electric power converter 28.

The electric power converter 28 is a device that converts the electric power output from the generator 26 into a predetermined electric power. The electric power converter 28 includes an inverter 281 that converts the electric power output from the generator 26 into an AC voltage of a predetermined frequency and outputs the AC voltage to the compressor 222 of the refrigeration cycle 220.

Figure 3:
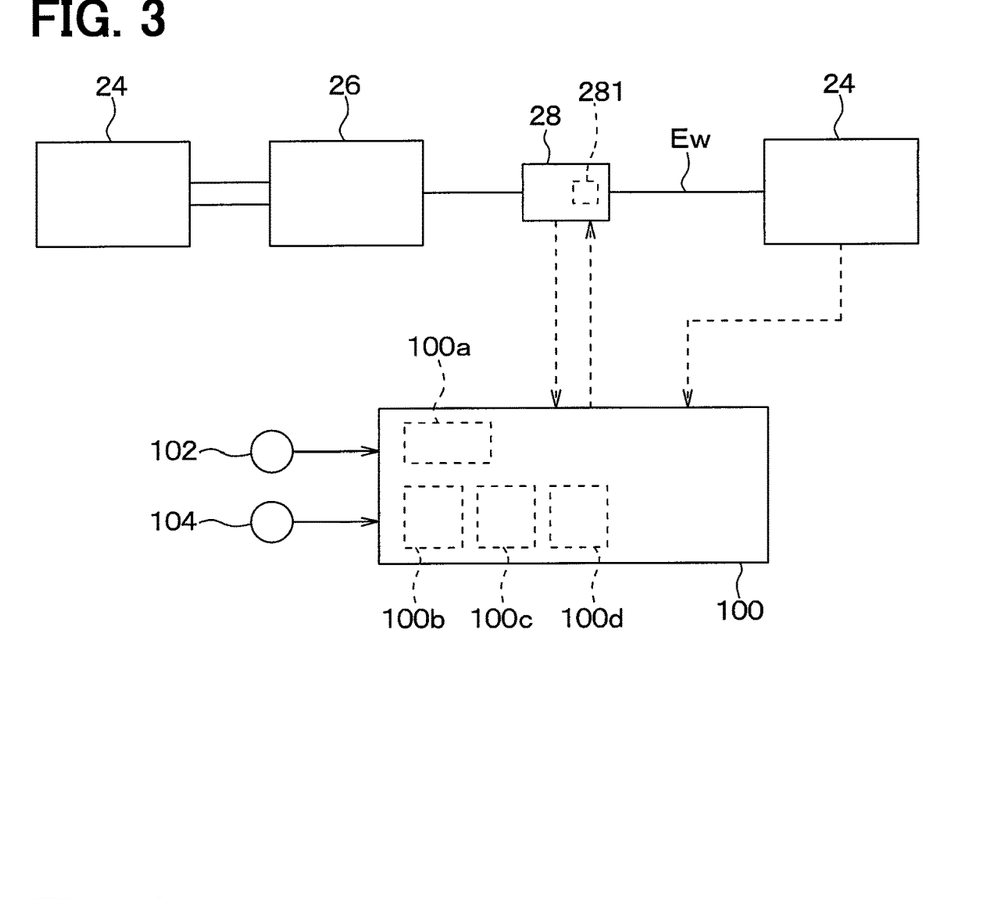
FIG. 3 is a block diagram of a refrigeration system according to the first embodiment.

Next, an electronic control unit of the refrigeration system 20 according to the present embodiment will be described with reference to FIG. 3. As shown in FIG. 3, the refrigeration system 20 includes a control device 100 as an electronic control unit. The control device 100 includes a processor for performing control processing and calculation processing, a microcomputer including a storage unit 100a such as a ROM and a RAM for storing programs, data, and the like, and peripheral circuits of the microcomputer (for example, auxiliary storage devices). The storage unit 100a of the control device 100 is a non-transitory tangible storage medium. The control device 100 performs various types of control processing and calculation processing based on a program stored in the storage unit 100a, and controls the operation of various types of control devices connected to the output side.

The electric power converter 28 is connected to an output side of the control device 100. The control device 100 outputs a control signal to the electric power converter 28 to supply a desired electric power to the compressor 222, to thereby control the compressor 222.

An input side of the control device 100 is connected with an outside air temperature sensor 101 for detecting the outside air temperature and a storage interior temperature sensor 102 for detecting the temperature of the storage space 140. Although not shown, a control panel including an operation setting unit for operating the refrigerator 22, a temperature setting unit for setting the temperature of the storage space 140, and the like is connected to the control device 100.

In this example, the control device 100 according to the present embodiment performs various calculations in accordance with sensor signals from various sensors connected to the input side of the control device 100, and controls various control devices connected to the output side of the control device 100. The control device 100 is a device in which multiple control units including hardware and software are integrated together.

In the control device 100, an output control unit 100b for adjusting an operation state of the refrigerator 22, a characteristic estimation unit 100c for estimating the refrigerator characteristics of the refrigerator 22, an output calculation unit 100d for calculating a target drive output which is a control target value of the drive output of the refrigerator 22, and the like are integrated together.

The output control unit 100b is a control unit that adjusts the operation state of the refrigerator 22 by controlling the drive output which is output from the electric power converter 28 to the compressor 222 of the refrigerator 22. The output control unit 100b is configured to control the drive output so as to approach the target drive output calculated by the output calculation unit 100d.

The characteristic estimation unit 100c is a control unit that estimates refrigerator characteristics of the refrigerator 22 according to the outside air temperature and the temperature of the storage space 140. The characteristic estimation unit 100c estimates the refrigerator characteristics corresponding to a detection value of the outside air temperature sensor 101 and a detection value of the storage interior temperature sensor 102 as the current refrigerator characteristics with reference to multiple refrigerator characteristics set in advance for each of the outside air temperature and the temperature of the storage space 140. In other words, the characteristic estimation unit 100c according to the present embodiment is configured to determine the current refrigerator characteristics, which are the refrigerator characteristics of the refrigerator 22 in the current state, according to the multiple refrigerator characteristics stored in the storage unit 100a based on the outside air temperature and the temperature of the storage space 140.

Figure 4:
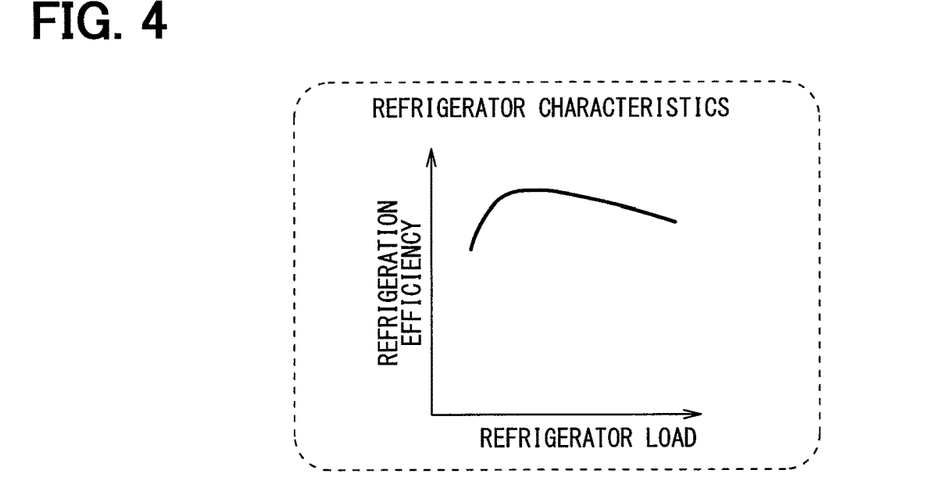
FIG. 4 is a characteristic diagram showing refrigerator characteristics defining a correspondence relationship between a refrigerator load and a refrigeration efficiency of a refrigerator.

For example, as shown in FIG. 4, the refrigerator characteristics are control characteristics in which a correspondence relationship between a refrigerator load that changes in correlation with the drive output of the refrigerator 22 and the refrigeration efficiency of the refrigerator 22 is defined. The refrigerator load is a work amount required to drive the devices such as the compressor 222, the first blower 225, and the second blower 229. A load of the compressor 222 fluctuates in accordance with an output from the electric power converter 28. On the other hand, the first blower 225 and the second blower 229 are not connected to the electric power converter 28, and therefore have a substantially constant load. For that reason, the refrigerator load varies substantially depending on the load of the compressor 222.

In the present embodiment, the refrigerator load is defined as the drive output of the refrigerator 22, and a correspondence relationship between the drive output of the refrigerator 22 and the refrigeration efficiency of the refrigerator 22 is defined as the refrigerator characteristics. In the storage unit 100a of the present embodiment, multiple refrigerator characteristics set for each of the outside air temperature and the temperature of the storage space 140 are stored as data.

The output calculation unit 100d calculates a target drive output, which is a control target value of the drive output of the refrigerator 22, based on the refrigerator characteristics estimated by the characteristic estimation unit 100c (that is, the current refrigerator characteristics), the engine characteristics of the electric power generation engine 24, and the generator characteristics of the generator 26.

Figure 5:
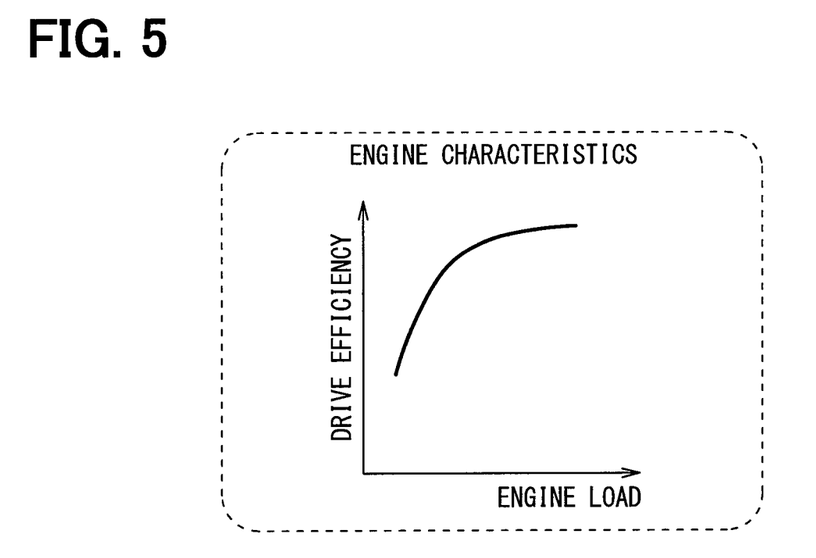
FIG. 5 is a characteristic diagram showing engine characteristics defining a correspondence relationship between an engine load and a drive efficiency of a power generation engine.

The engine characteristics are, for example, as shown in FIG. 5, control characteristics in which a correspondence relationship between an engine load that changes in correlation with the drive output of the generator 26 and the drive efficiency of the power generation engine 24 are defined. The engine load is an amount of work required to maintain the rotation speed of the power generation engine 24 at a reference rotation speed. The engine load increases as the drive output of the generator 26 increases. The drive efficiency increases as the engine load increases. For that reason, according to the present embodiment, the engine load is defined as the drive output of the refrigerator 22 having a correlation with the drive output of the generator 26, and a correspondence relationship between the drive output of the refrigerator 22 and the drive efficiency of the power generation engine 24 is defined as the engine characteristics. In the storage unit 100a of the present embodiment, engine characteristics are stored as data.

Figure 6:
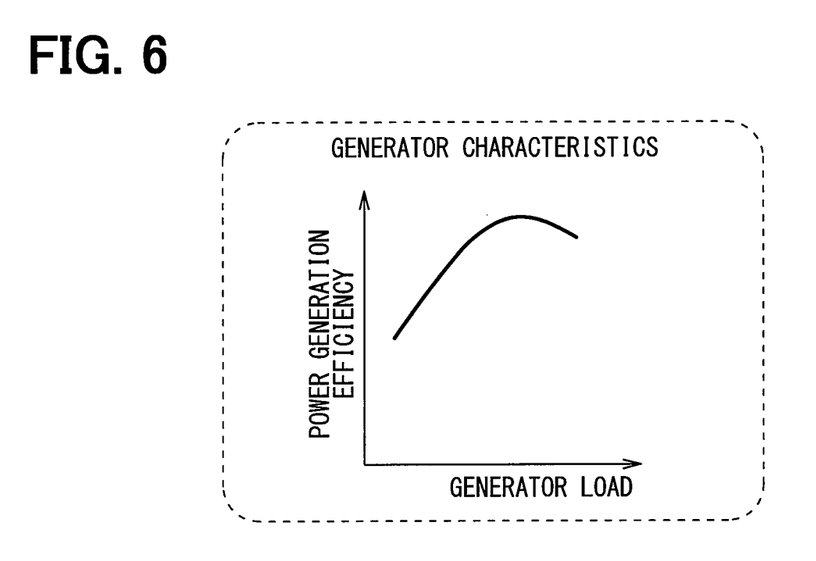
FIG. 6 is a characteristic diagram showing generator characteristics defining a correspondence relationship between a generator load and a power generation efficiency of a generator.

The generator characteristics are, for example, as shown in FIG. 6, control characteristics in which a correspondence relationship between a generator load that changes in correlation with the drive output of the refrigerator 22 and the power generation efficiency of the generator 26 are defined. The generator load is the amount of work required to drive the refrigerator 22. In the present embodiment, the generator load is defined as the drive output of the refrigerator 22, and the correspondence relationship between the drive output of the refrigerator 22 and the drive efficiency of the generator 26 is defined as the generator characteristic. The storage unit 100a according to the present embodiment stores the generator characteristics as data. The generator load is affected by the conversion efficiency of the electric power converter 28. For that reason, it is desirable to set the generator load in consideration of the conversion efficiency in the electric power converter 28.

Next, the operation of the refrigeration system 20 in the above configuration will be described. In the refrigeration system 20 of the present embodiment, when the operation of the refrigerator 22 is set by the operation setting unit of the control panel, the refrigerator 22 is operated to start the temperature adjustment of the storage space 140. The temperature of the storage space 140 is adjusted by the control device 100 executing a control program stored in the storage unit 100a.

Figure 7:
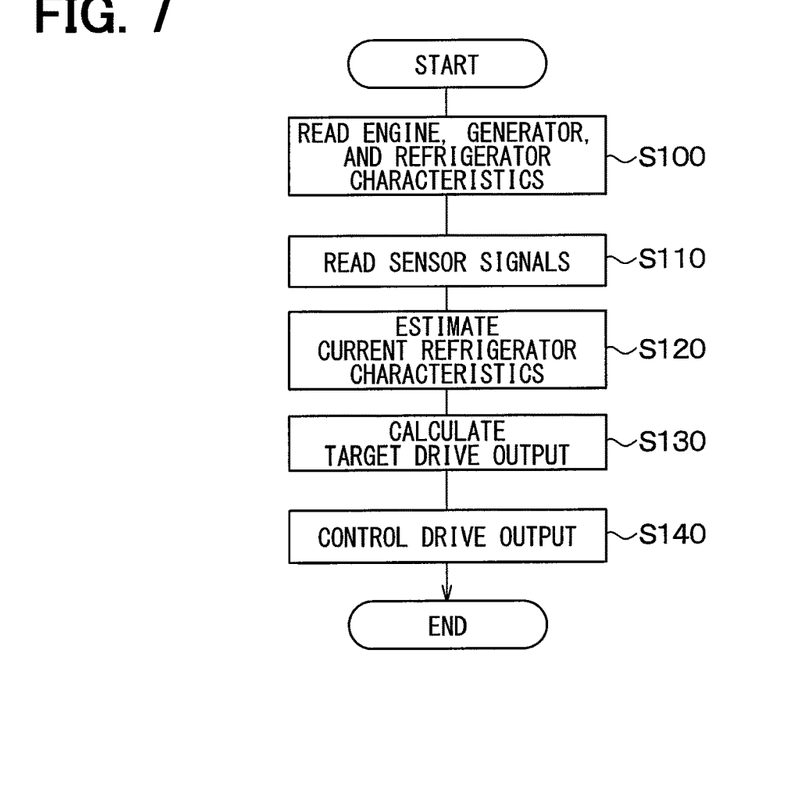
FIG. 7 is a flowchart showing a flow of control processing to be executed by a control device of the refrigeration system according to the first embodiment.

Hereinafter, the temperature adjustment processing of the storage space 140 executed by the control device 100 will be described with reference to a flowchart of FIG. 7. FIG. 7 is a flowchart showing a flow of control processing to be executed by the control device 100. A control routine shown in FIG. 7 is executed in a predetermined control cycle. Each control step shown in FIG. 7 configures a function realization unit for realizing various functions to be executed by the control device 100. This also applies to each control step of FIG. 10, which will be described later.

As shown in FIG. 7, in Step S100, the control device 100 reads the engine characteristics, the generator characteristics, and the multiple refrigerator characteristics stored in the storage unit 100a. In Step S110, the control device 100 reads sensor signals of various sensors such as the outside air temperature sensor 101 and the storage interior temperature sensor 102.

Figure 8:
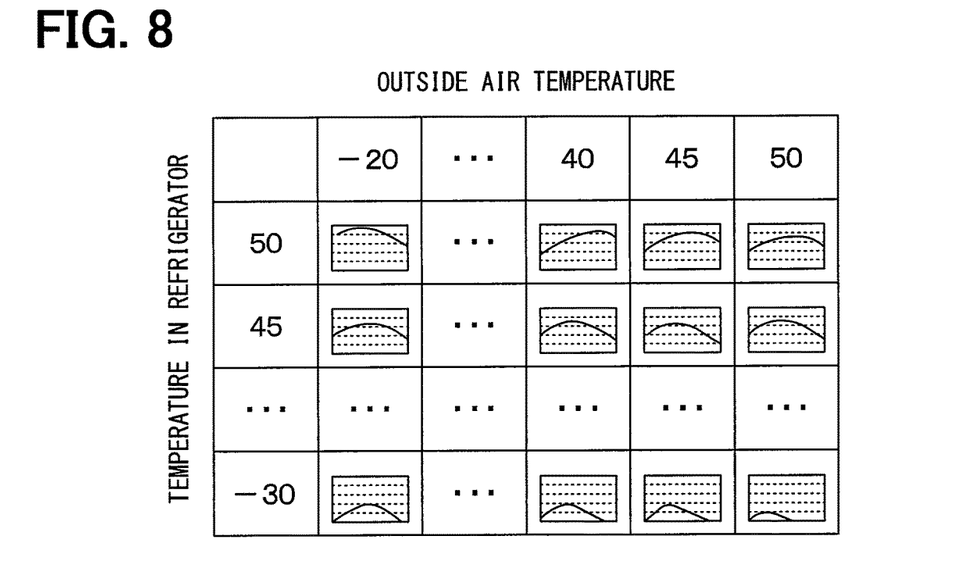
FIG. 8 is an illustrative diagram illustrating multiple refrigerator characteristics set for each of an outside air temperature and a temperature of a storage space.

Subsequently, in Step S120, the control device 100 estimates the current refrigerator characteristics. Specifically, in a process of Step S120, the control device 100 estimates the refrigerator characteristics corresponding to the current outside air temperature and the temperature of the storage space 140 as the current refrigerator characteristics with reference to a control map in which a correspondence relationship with the outside air temperature, the temperature of the storage space 140, and the refrigerator characteristics shown in FIG. 8 is defined. The control map shown in FIG. 8 is provided by data stored in advance in the storage unit 100a.

Returning to FIG. 7, in Step S130, the control device 100 calculates a target drive output which is a target control value of the drive output of the refrigerator 22. In a process of Step S130, the control device 100 calculates the target drive output based on the engine characteristics and the generator characteristics stored in the storage unit 100a and the current refrigerator characteristics estimated in Step S120.

Figure 9:
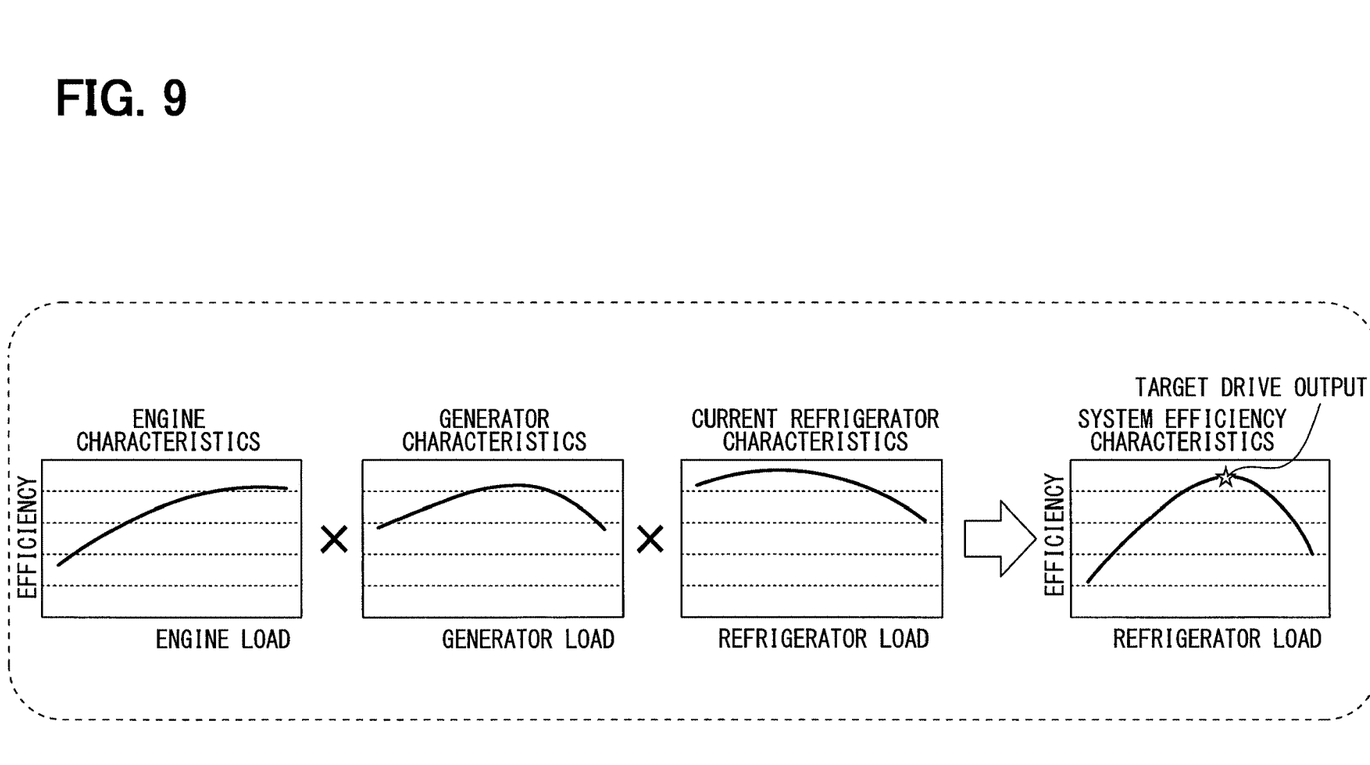
FIG. 9 is an illustrative diagram illustrating a method of calculating a target drive output in the refrigeration system according to the first embodiment.

Specifically, in the process of Step S130, as shown in FIG. 9, the control device 100 multiplies the efficiencies corresponding to various loads in the engine characteristics, the generator characteristics, and the current refrigerator characteristics by each other to calculate the system efficiency characteristics indicating the correspondence relationship between the refrigerator load and the energy efficiency of the entire system. Then, in the process of Step S130, the control device 100 identifies the refrigerator load for which the efficiency of the entire system is optimal according to the system efficiency characteristic, and calculates the drive output corresponding to the refrigerator load as the target drive output.

Returning to FIG. 7, in Step S140, the control device 100 controls the drive output of the refrigerator 22 so as to approach the target drive output. Specifically, the control device 100 supplies a desired power to the compressor 222 of the refrigerator 22 through the electric power converter 28 so that the drive output of the refrigerator 22 approaches the target drive output, to thereby control the compressor 222 in the refrigerator 22. As a result, in the refrigeration system 20, the refrigerator 22 operates in a state in which the energy efficiency of the entire system is optimized.

The refrigeration system 20 according to the present embodiment described above is configured to control the operation of the refrigerator 22 with the drive output that optimizes the energy efficiency of the entire system as the target drive output.

In the refrigeration system 20 configured as described above, the energy efficiency of the entire system can be optimized without adding functional components for changing the rotation speed of the power generation engine 24. In other words, in the refrigeration system 20 according to the present embodiment, the energy efficiency of the entire system can be improved while reducing the complexity of the system configuration.

Specifically, the refrigeration system 20 according to the present embodiment is configured to calculate the target drive output based on the engine characteristics, the generator characteristics, and the current refrigerator characteristics. In the refrigeration system 20 configured as described above, the energy efficiency of the entire system can be optimized without changing the rotation speed of the power generation engine 24.

The refrigeration system 20 according to the present embodiment includes the vapor compression type refrigeration cycle 220 in which the refrigerator 22 includes the electric compressor 222. The electric power converter 28 includes an inverter 281 that converts the electric power generated by the generator 26 into a drive output of the compressor 222 and controls the rotation speed of the compressor 222. In the configuration described above, the rotation speed of the compressor 222 is controlled by the inverter 281 so that the target drive output can be obtained, thereby being capable of optimizing the energy efficiency in the entire system.

Further, in the refrigeration system 20 according to the present embodiment, the power generation engine 24 is a constant speed type engine in which the rotation speed is maintained at a predetermined reference rotation speed. In the refrigeration system 20 according to the present embodiment, even if the power generation engine 24 is a constant-speed type engine, the energy efficiency of the entire system can be improved.

In particular, consider a refrigeration system for a comparative example, in which a constant speed engine which is maintained at a predetermined rotation speed is employed as the power generation engine, and the power generation engine operates at a high rotation speed even when a load of the refrigerator is small. In this case, the energy efficiency of the entire system degrades due to the mismatch between the rotation speed of the power generation engine and the load of the refrigerator.

Additionally, consider a refrigeration system for another comparative example, in which the power generation engine is configured with a variable rotation speed in accordance with the load of the refrigerator in order to improve the energy efficiency of the entire system. In this case, there is a need to add a configuration for changing the rotation speed of the power generation engine, and there is a conflict in that the overall system configuration becomes remarkably complicated.

In contrast to the above comparative examples, according to the present disclosure, since the refrigerator is operated such that the drive output at which the energy efficiency of the entire system is optimized is set as the target drive output, the energy efficiency of the entire system can be optimized without adding means for changing the rotation speed of the power generation engine. In other words, in the refrigeration system according to the present disclosure, the energy efficiency of the entire system can be improved while reducing the complexity of the system configuration.

Second Embodiment

Next, a second embodiment will be described with reference to FIGS. 10 and 11. In the present embodiment, the content of a control process to be executed by a control device 100 is different from that of the first embodiment.

Hereinafter, a temperature adjustment processing of a storage space 140 to be performed by the control device 100 according to the present embodiment will be described with reference to a flowchart of FIG. 10. FIG. 10 is a flowchart showing a flow of control processing to be executed by the control device 100. A control routine shown in FIG. 10 is executed in a predetermined control cycle. The processing of Steps S100 to S140 shown in FIG. 10 is the same as the processing of Steps S100 to S140 shown in FIG. 7. For that reason, according to the present embodiment, a description of the processes of Steps S100 to S140 shown in FIG. 10 will be omitted or simplified.

Figure 10:
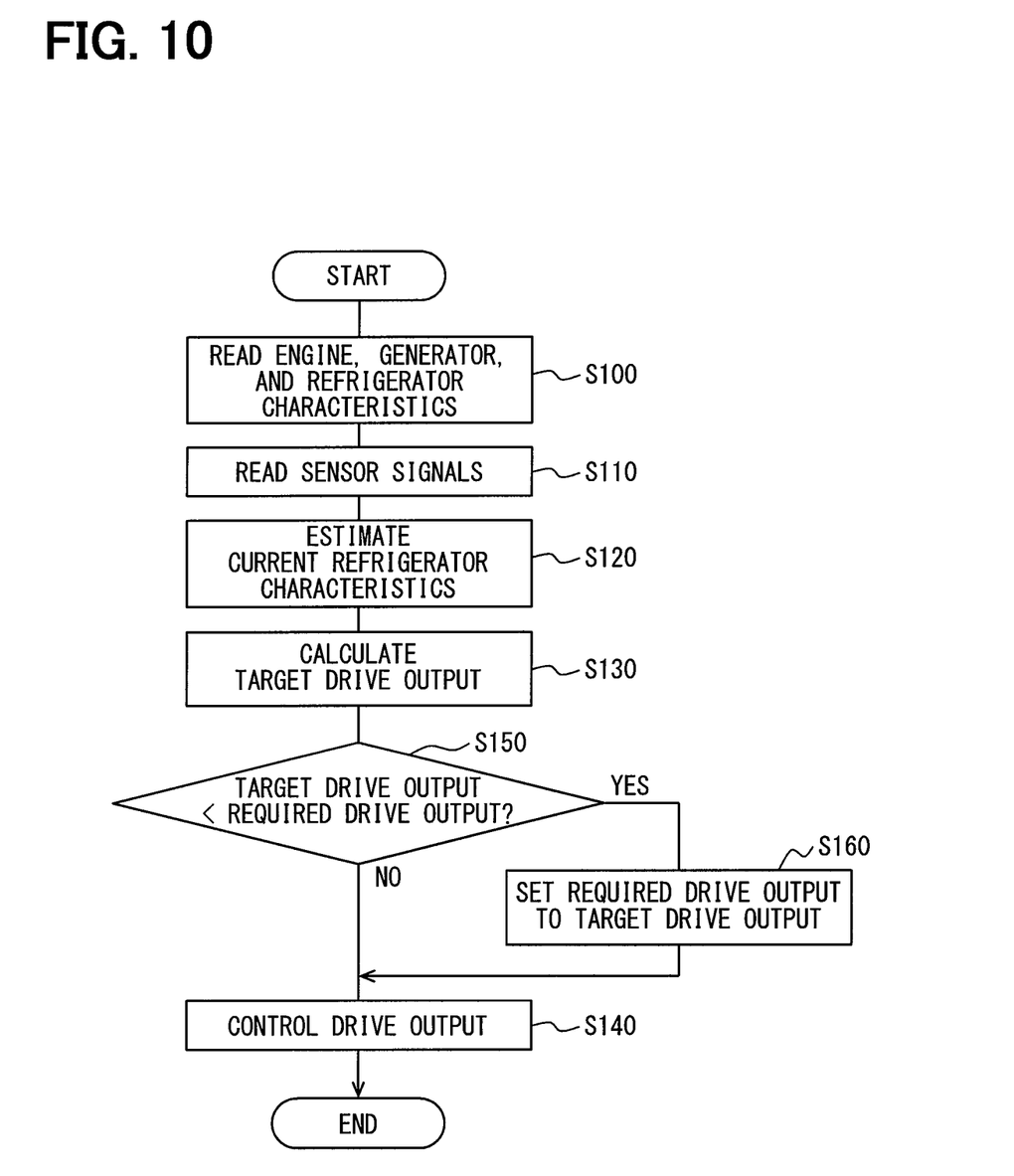
FIG. 10 is a flowchart showing a flow of control processing to be executed by a control device of a refrigeration system according to a second embodiment.

As shown in FIG. 10, after calculating a target drive output in Step S130, in Step S150, the control device 100 according to the present embodiment determines whether or not a target drive output is lower than a required drive output of a refrigerator 22 required for temperature adjustment of a storage space 140.

In this example, the required drive output is set so as to increase as a temperature difference between an outside air temperature and a temperature of the storage space 140 increases, and to decrease as the temperature difference between the outside air temperature and the temperature of the storage space 140 decreases, for example. The required drive output may be set to a fixed value.

When it is determined in a determination process of Step S150 that the target drive output is lower than the required drive output, the control device 100 sets the required drive output to the target drive output in Step S160. Thereafter, the control device 100 shifts to Step S140 to control the drive output.

Figure 11:
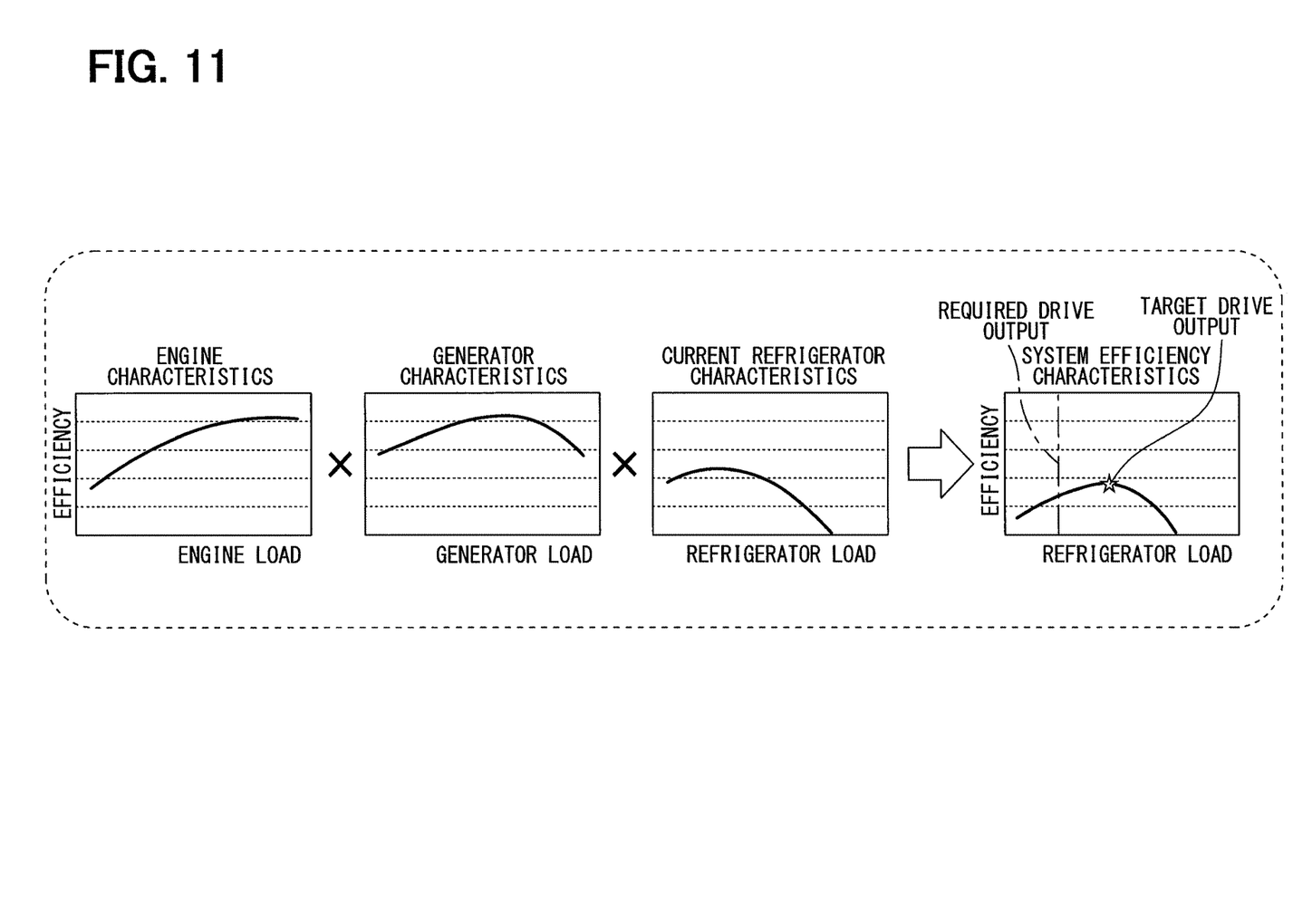
FIG. 11 is an illustrative diagram illustrating a method of calculating a target drive output in the refrigeration system according to the second embodiment.

Specifically, in a process of Step S160, when the target drive output shown in FIG. 11 is lower than the required drive output, the required drive output is set to the target drive output.

On the other hand, if it is determined in the determination process of Step S150 that the target drive output is equal to or greater than the required drive output, the control device 100 skips Step S160 and shifts to Step S140 to control the drive output.

The other configuration is the same as that of the first embodiment. A refrigeration system 20 according to the present embodiment having the common configuration to that in the first embodiment can obtain the same operation and effects as those of the refrigeration system 20 of the first embodiment.

The refrigeration system 20 according to the present embodiment is configured to control the drive output so as to approach the required drive output when the target drive output calculated from the system efficiency characteristics is lower than the required drive output. Since the refrigeration system 20 according to the present embodiment can secure at least the required drive output, the energy efficiency of the entire system can be improved while avoiding the shortage of the capacity of the refrigerator 22.

Other Embodiments

Although representative embodiments of the present disclosure have been described above, the present disclosure is not limited to the embodiments described above, and various modifications can be made, for example, as follows.

In each of the embodiments described above, an example in which the refrigerator 22 is provided by the vapor compression type refrigeration cycle 220 has been described, but the present disclosure is not limited to the above configuration. The refrigerator 22 is not limited to the refrigeration cycle 220, and may be another type of refrigerator.

In each of the embodiments described above, an example in which the outside air temperature is detected by the outside air temperature sensor 101 has been described, but the present disclosure is not limited to the above configuration. For example, the refrigeration system 20 may be configured to estimate the outside air temperature from the detection value of the pressure sensor that detects the refrigerant pressure on the refrigerant discharge side of the compressor 222.

In each of the embodiments described above, an example in which the temperature of the storage space 140 is detected by the storage interior temperature sensor 102 has been described, but the present disclosure is not limited to the above configuration. For example, the refrigeration system 20 may be configured to estimate the temperature of the storage space 140 from the detection value of the pressure sensor that detects the refrigerant pressure on the refrigerant intake side of the compressor 222.

In each of the embodiments described above, an example in which the generator 26 is directly connected to the output shaft of the power generation engine 24 has been described, but the present disclosure is not limited to the above configuration. The generator 26 may be configured to be connected to the power generation engine 24 through a power transmission mechanism such as a pulley and a belt, for example.

In each of the embodiments described above, a constant speed type engine is exemplified as the power generation engine 24, but the present disclosure is not limited to the above configuration. The power generation engine 24 may be, for example, a constant-speed type engine whose rotation speed is maintained at a reference rotation speed of multiple stages, such as a low-speed rotation speed and a high-speed rotation speed. In that case, the engine characteristics and the generator characteristics corresponding to each reference rotation speed may be stored in the storage unit 100a.

In each of the embodiments described above, an example in which the refrigeration system 20 of the present disclosure is applied to a refrigeration vehicle 1 that transports frozen foods and the like has been described, but the present disclosure is not limited to the above configuration. The refrigeration system 20 according to the present disclosure is not limited to a refrigeration vehicle, and can be applied to other moving objects.

In the embodiments described above, it is needless to say that the elements configuring the embodiments are not necessarily essential except in the case where the elements are clearly indicated to be essential in particular, the case where the elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when the numerical values are expressly indispensable, and when the numerical values are obviously limited to the specific numbers in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like, and the like.

CONCLUSION

According to a first aspect corresponding to a portion or all of the above described embodiments, a refrigeration system includes a characteristic estimation unit that estimates a refrigerator characteristic of a refrigerator according to an outside air temperature and a temperature of a cooling target space. Further, the refrigeration system includes an output calculation unit that calculates the drive output as a target drive output that optimizes an energy efficiency of the entire system based on the refrigerator characteristic estimated by the characteristic estimation unit, a preset engine characteristic of a power generation engine, and a preset generator characteristic of a generator. In addition, an output control unit controls the drive output to approach the target drive output calculated by the output calculation unit.

Further, according to a second aspect, the refrigeration system includes a storage unit in which the engine characteristic, the generator characteristic, and a plurality of sets of refrigerator characteristics for each outside air temperature and cooling target space temperature are stored as data.

The refrigerator characteristic defines a correspondence relationship between a refrigerator load which changes in correlation with the drive output and a refrigeration efficiency of the refrigerator. The engine characteristic defines a correspondence relationship between the engine load which changes in correlation with the drive output and a drive efficiency of the power generator engine. The generator characteristic defines a correspondence relationship between a generator load which changes in correlation with the drive output and a power generation efficiency of the generator.

The characteristic estimation unit is configured to estimate a current refrigerator characteristic which is the refrigerator characteristic of the refrigerator in the current state from the plurality of sets of refrigerator characteristics stored in the storage unit based on the outside air temperature and the temperature of the cooling target space. Further, the output calculation unit is configured to calculate the target drive output based on the engine characteristic, the generator characteristic, and the current refrigerator characteristic.

In this regard, with a configuration in which the target drive output is calculated based on the engine characteristic, the generator characteristic, and the current refrigerator characteristic, it is possible to optimize the energy efficiency of the entire system without using a configuration in which the rotation speed of the power generation engine is variable.

Further, according to a third aspect, the output control unit of the refrigeration system is configured to, when the target drive output calculated by the output calculation unit is lower than a required drive output of the refrigerator required for temperature adjustment of the cooling target space, control the drive output to approach the required drive output. Due to this, it is possible to ensure that at least the required drive output is provided. Accordingly, it is possible to improve the energy efficiency of the entire system while avoiding an insufficient amount of cooling from the refrigerator.

Further, according to a fourth aspect, the refrigerator of the refrigeration system includes a vapor compression type refrigeration cycle including an electric compressor which compresses and discharges a refrigerant. Further, the electric power converter includes an inverter which converts an electric power generated by the generator into a drive output for the electric compressor to control a rotation speed of the electric compressor. Due to such a configuration, it is possible to optimize the energy efficiency of the entire system by controlling the rotation speed of the compressor with the inverter such that the target drive output is provided.

Further, according to a fifth aspect, the power generation engine of the refrigeration system is provided by a constant speed engine whose rotation speed is maintained at a predetermined reference rotation speed. Thus, according to the refrigeration system of the present disclosure, it is possible to improve the energy efficiency of the entire system even when a constant speed engine is provided as the power generation engine.

Further, according to a sixth aspect, a refrigeration system control device includes an output control unit that controls the drive output from the electric power converter to the refrigerator to adjust an operation state of the refrigerator. Further, the refrigeration system control device includes a characteristic estimation unit that estimates a refrigerator characteristic of the refrigerator according to an outside air temperature and a temperature of the cooling target space. Further, refrigeration system control device includes an output calculation unit that calculates the drive output as a target drive output that optimizes an energy efficiency of the entire system based on the refrigerator characteristic estimated by the characteristic estimation unit, a particular engine characteristic of the power generation engine, and a particular generator characteristic of the generator. Further, the output control unit controls the drive output to approach the target drive output calculated by the output calculation unit.

The invention claimed is:

1. A refrigeration system applied to a moving object, the refrigeration system comprising:
    a generator;
    a power generation engine that drives the generator;
    a refrigerator that adjusts a temperature of a cooling target space;
    an electric power converter that converts an electric power generated by the generator into a drive output for the refrigerator and supplies the drive output to the refrigerator;
    an output control unit that controls the drive output from the electric power converter to the refrigerator to adjust an operation state of the refrigerator;
    a characteristic estimation unit that estimates a refrigerator characteristic of the refrigerator according to an outside air temperature and a temperature of the cooling target space; and
    an output calculation unit that calculates the drive output as a target drive output that optimizes an energy efficiency of the entire system based on the refrigerator characteristic estimated by the characteristic estimation unit, a preset engine characteristic of the power generation engine, and a preset generator characteristic of the generator, wherein
    the output control unit controls the drive output to approach the target drive output calculated by the output calculation unit.

2. The refrigeration system according to claim 1, further comprising:
    a storage unit in which the engine characteristic, the generator characteristic, and a plurality of sets of refrigerator characteristics for each outside air temperature and cooling target space temperature are stored as data, wherein
    the refrigerator characteristic defines a correspondence relationship between a refrigerator load which changes in correlation with the drive output and a refrigeration efficiency of the refrigerator,
    the engine characteristic defines a correspondence relationship between the engine load which changes in correlation with the drive output and a drive efficiency of the power generator engine,
    the generator characteristic defines a correspondence relationship between a generator load which changes in correlation with the drive output and a power generation efficiency of the generator,
    the characteristic estimation unit is configured to estimate a current refrigerator characteristic which is the refrigerator characteristic of the refrigerator in the current state from the plurality of sets of refrigerator characteristics stored in the storage unit based on the outside air temperature and the temperature of the cooling target space, and
    the output calculation unit is configured to calculate the target drive output based on the engine characteristic, the generator characteristic, and the current refrigerator characteristic.

3. The refrigeration system according to claim 1, wherein the output control unit is configured to, when the target drive output calculated by the output calculation unit is lower than a required drive output of the refrigerator required for temperature adjustment of the cooling target space, control the drive output to approach the required drive output.

4. The refrigeration system according to claim 1, wherein the refrigerator includes a vapor compression type refrigeration cycle including an electric compressor which compresses and discharges a refrigerant, and the electric power converter includes an inverter which converts an electric power generated by the generator into a drive output for the electric compressor to control a rotation speed of the electric compressor.

5. The refrigeration system according to claim 1, wherein the power generation engine is provided by a constant speed engine whose rotation speed is maintained at a predetermined reference rotation speed.

6. A control device for a refrigeration system including a generator, a power generation engine that drives the generator, a refrigerator that adjusts a temperature of a cooling target space, and an electric power converter that converts an electric power generated by the generator into a drive output for the refrigerator, the control device comprising:
    an output control unit that controls the drive output from the electric power converter to the refrigerator to adjust an operation state of the refrigerator;

a characteristic estimation unit that estimates a refrigerator characteristic of the refrigerator according to an outside air temperature and a temperature of the cooling target space; and an output calculation unit that calculates the drive output as a target drive output that optimizes an energy efficiency of the entire system based on the refrigerator characteristic estimated by the characteristic estimation unit, a preset engine characteristic of the power generation engine, and a preset generator characteristic of the generator, wherein the output control unit controls the drive output to approach the target drive output calculated by the output calculation unit.

7. A refrigeration system for a vehicle, the refrigeration system comprising:

a generator;

a power generation engine that drives the generator;

a refrigerator that adjusts a temperature of a cooling target space;

an electric power converter that converts an electric power generated by the generator into a drive output for the refrigerator and supplies the drive output to the refrigerator; and an electronic control unit including a processor and a memory having control programs stored therein, the electronic control unit being configured to control the drive output from the electric power converter to the refrigerator to adjust an operation state of the refrigerator, wherein the electronic control unit is programmed to:

estimate a refrigerator characteristic of the refrigerator according to an outside air temperature and a temperature of the cooling target space, calculate the drive output as a target drive output that optimizes an energy efficiency of the entire system based on the estimated refrigerator characteristic, a preset engine characteristic of the power generation engine, and a preset generator characteristic of the generator, and control the operation of the electric power converter such that the drive output is adjusted toward the target drive output calculated by the output calculation unit.

* * * * *